(12) United States Patent
Kim

(10) Patent No.: US 6,310,871 B1
(45) Date of Patent: Oct. 30, 2001

(54) METHODS FOR GROUPING AND UNGROUPING SECTORS OF A CELL IN A CELLULAR COMMUNICATION SYSTEM

(75) Inventor: Tae-Hyoun Kim, Boochon (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/151,454

(22) Filed: Sep. 10, 1998

(30) Foreign Application Priority Data

Sep. 10, 1997 (KR) .................................................. 97-46507

(51) Int. Cl.$^7$ .................................................. H04B 7/216
(52) U.S. Cl. ............................................. 370/342; 455/446
(58) Field of Search ..................................... 370/342, 320, 370/331, 209, 324, 332, 335, 441, 491; 455/446

(56) References Cited

U.S. PATENT DOCUMENTS 5,309,503   5/1994   Bruckert et al. .
6,115,609 * 9/2000   Kim et al. ............................ 455/442

* cited by examiner

*Primary Examiner*—Huy D. Vu
*Assistant Examiner*—Alexander O. Boakye
(74) *Attorney, Agent, or Firm*—Dilworth & Barrese, LLP

(57) ABSTRACT

Methods for grouping and ungrouping sectors of a cell in a cellular communication system are provided. Sector grouping is performed by generating a common PN offset for each of the sectors, and then changing the unique PN offset of each of the sectors to the common PN offset. Sector ungrouping is performed by generating unique PN offsets for each of the sectors in the group, and then changing the common PN offset for each sector to one of the unique PN offsets.

12 Claims, 6 Drawing Sheets

METHODS FOR GROUPING AND UNGROUPING SECTORS OF A CELL IN A CELLULAR COMMUNICATION SYSTEM

FIELD OF THE INVENTION

The present invention relates to cellular communication systems and, more specifically, to a method for grouping and ungrouping sectors of a cell in a cellular communication system.

DESCRIPTION OF THE RELATED ART

In general, mobile communication systems such as Personal Communication Service (PCS) and Code Division Multiple Access (CDMA) communication systems include a plurality of Base Station Transceiver Subsystems (BTS) for serving mobile terminals, a plurality of Base Station Controllers (BSCs), a plurality of Base Station Manager Systems (BSMs) for managing and controlling the plurality of BSCs, a plurality of Mobile Switching Centers (MSCs), and a plurality of Home Location Registers (HLRs).

Cellular systems perform communications based on the cell unit. A cell is the geographic service area covered by a BTS. In general, a cell is classified as an omni-cell or a three sector cell. A mobile station communicates with a base station that supports the cell within which the mobile station is located. The communication is performed via forward and reverse communication channels. A forward communication channel is a channel that is formed from a base station to a mobile station, and includes a pilot channel, a synchronization channel, a paging channel, and a plurality of forward traffic channels. A reverse communication channel is a channel that is formed from a mobile station to a base station, and includes an access channel and a plurality of reverse traffic channels. The mobile and base stations exchange (transmit and receive) voice information and data through the traffic channels. The respective base stations are assigned frequencies according to system capacity, and utilize as many frequency channels as are assigned. The respective frequency channels are referred to as frequency assignments (FAs). A CDMA system includes several access channels by differing in the PN offset and the sequence per one frequency channel.

The systems under the mobile switching center with respect to hierarchy are conventionally referred to as base station subsystems (BSS). The base station subsystems include, in descending order, the BSM, the BSC, and the base stations. The main processors in the BSC and BTS are the call control processor (CCP) and the BTS control processor (BCP), respectively.

During operation, mobile stations should not suffer from communication failures when moving from region to region (i.e., cell to cell). Accordingly, when in an idle state, a mobile station should regularly re-register itself to the system according to various parameters. Further, in order to maintain sufficient efficiency with respect to the radio link when a call is in progress, the mobile station, base station and MSC manage the communication between the base station and the mobile station.

A CDMA communication system is capable of receiving mobile transmissions from two or more BTS at the same time. Additionally, a mobile station is capable of receiving signals transmitted from two or more BTSs at the same time. Due to these capabilities, handoffs can be conducted from one BTS to another BTS, or from one antenna region to another antenna region in a single BTS area. The term handoff refers to the processing procedure performed when a mobile station moves from one base station area to another base station area, or from one sector to another sector within a single base station area. During the handoff procedure, it is important that the call be maintained and also, that the quality of the voice information exchanged during the call not deteriorate. Accordingly, various types of handoffs are provided to ensure the continuity of a call in a CDMA cellular system and a PCS system. However, each type of handoff provides varying reliability with respect to maintaining the continuity of a call. Further, the load imposed on the CDMA and/or PCS system varies with each type of handoff.

The establishment and termination of a channel during a handoff procedure are referred to as an "add" and a "drop, respectively. In general, there are two types of handoffs, a soft handoff and a hard handoff. In a soft handoff procedure, which is also referred to as a make-before-break procedure, a new call is made before an existing call is broken (terminated). That is, a soft handoff is a procedure for setting up a communication path for a call wherein the mobile station communicates via two or more channels (to the serving cell and one or more target cells) to ensure the continuity of the call. In a hard handoff procedure, which is also referred to as a break-before-make procedure, an existing call is disconnected before a new call is made. In general, when a handoff is required because the mobile station is moving outside a cell boundary, a soft handoff is performed with respect to the call. However, in some unavoidable situations, a hard handoff is performed to ensure the continuity of the call. Nonetheless, because a CDMA system can concurrently establish multiple communication paths with different codes through identical frequency bands, soft handoffs are typically performed.

In a soft handoff procedure, when the signal strength of another communication path is greater than a threshold value, the mobile station concurrently communicates via the originally connected communication path and the new communication path. Then, the base station selects the best signal among the multiple signals of the multiple communication paths. When the signal strength of a particular communication path among the currently connected multiple communication paths becomes lower than a threshold value, the particular communication path is canceled.

Since a mobile station can concurrently establish two or more communication paths, the communication path having the best quality among the multiple communication paths is selected. As a result, the quality of the call is improved, and the continuity of the call is maintained. Additionally, by selecting the best communication path, the minimum necessary power is transmitted, thereby facilitating proper power control.

Upon receiving the appropriate communication signals, the receivers determine that transmission will begin soon, and set up a correct time reference for synchronization. At the time of synchronization, especially at the time when the system is initially synchronized, it is desirable to use signals which exhibit maximum autocorrelation functions at a 0 time shift and very small autocorrelation functions at all other time shifts.

For this purpose, it is possible to pre-store specific code words to the memory of the transmitter and the receiver. In addition, a binary shift register series generator, which is a relatively simple linear system, may be used to generate codes (i.e., binary sequences) which have sufficient auto-correlation characteristics. Shift registers are composed of serially connected binary memories. The binary values stored in the memories are transmitted to subsequent memories under the control of a clock pulse. Accordingly, the output of a three stage shift register is delayed by the time interval corresponding to three clock pulses. In any case, this shift register stores the most recent serial three bits among the input bit strings.

A binary shift register series generator has n stage shift registers, and an output which is fed back to the input of the generator and is connected to a logic combiner and several taps. A pseudo-random noise (PN) code generator, which is composed of n stage shift registers, can be employed to continuously generate n bit outputs of $2^n-1$ (the all zeros state is not included). The resulting bit sequence is referred to as a "PN sequence" because it appears to be random noise code except to those people who know the number of shift registers and taps employed. A PN sequence has very desirable autocorrelation properties since the maximum autocorrelation value of all the PN sequences is given at 0 shift and a reduced autocorrelation value is given at all other time shifts in one cycle. As a result, the power spectrum density for a PN sequence approaches white spectrum density as the series length increases. The autocorrelation of the ideal maximal length codes have a maximum value at the main peak and a constant value in all other cases. The above PN sequence belongs to one of the maximal length codes which can be generated by the shift registers of a fixed length.

In a CDMA system, the offset of a PN sequence (i.e., the PN offset) is utilized to expand the bandwidth of modulated signals to increase the transmission bandwidth. The PN offset is also used to discern between BTSs associated with users who utilize the same transmission bandwidth (i.e., a multi-access channel of same frequency channel).

In a sectored cell structure, each sector has an antenna located within an area associated with a particular base station. The PN sequence offset and the long code, which are used to distinguish each sector and user from one another, respectively, are multiplied together and then transmitted. That is, each modulator chip multiplies the signals received by the base station from the MSC via the BSC by the PN offset of each sector and the long code to transmit the result.

FIG. 1 is a schematic diagram of a base station which uses sectored cells. Signals are modulated by a CDMA Channel Element board Assembly (CCEA) 10 on a per sector basis, matched to a respective I_channel and Q_channel by a Control And Transmit board Assembly (CATA) 12, and then connected (provided) to the transceivers 16 and antennas 18 managing each sector via a Sector Interface Card Assembly (SICA) 14. The transceiver 16 for each sector transmits the received signals to the mobile stations through the antenna 18 which is under its control.

The CCEA includes Control Digital Signal Processors (CDSP) and two modulators. Each modulator control eight channels. Thus, the CCEA controls a total of 16 channels. Each channel provides three paths to three sectors, whereby the output of each channel is added so as to transmit the result.

FIG. 2 is a schematic diagram illustrating channel assignment paths in a channel card within the base station. As stated above, a channel card has two modulators, with each modulator having eight channels. By way of example, referring to Channel #1, a signal is encoded by encoder 20, bit interleaved by interleaver 22, scrambled by a scrambler 24 with codes from a long code generator 26, multiplexed by multiplexer 28 (in the respective channel), and then transmitted through the three sector paths α, β and γ.

When the mobile terminal (mobile station) moves between sectors in a system having the above defined structure, the performance of a handoff may result in the call being terminated. The handoff call which maintains the call is prior to the originating call.

When the number of subscribers increase so that the serving cell becomes smaller due to sectoring, a handoff may be required for a subscriber moving at a high rate of speed. As a result, a failure may occur with respect to the continuity of the call.

SUMMARY OF THE INVENTION

It is therefore an object of the present invention to provide in a cellular communication system a method for grouping and ungrouping among sectors so as to provide greater call service reliability.

In one aspect of the invention, a method for grouping a plurality of sectors of a cell in a cellular communication system comprises the steps of: generating pilot signals having a common pseudo-random noise (PN) offset, the common PN offset being different than each of a plurality of distinct PN offsets, each of the plurality o f distinct PN offsets being included in one of a plurality of pilot signals and being associated with one of the plurality of sectors; respectively adding the common PN offset to each of the plurality of distinct PN offsets; outputting the pilot signals having the common PN offset and the plurality of pilot signals each having one of the plurality of distinct PN offsets; respectively reporting signal strengths of the pilot signals having the common PN offset by mobile stations to the base station, when the signal strengths increase above a predefined threshold; respectively transmitting a traffic signal to the mobile stations by the base station utilizing a channel other than a pilot channel; respectively reducing the signal strengths of the plurality of pilot signals each having one of the plurality of distinct PN offsets and being transmitted to each of the plurality of sectors; respectively transmitting the traffic signal to the mobile stations through a new path by the base station, when the signal strengths of the plurality of pilot signals decrease to below a predefined threshold; and discontinuing communication using the plurality of distinct PN offsets by the mobile stations so that the mobile stations perform communication using only the common PN offset.

In another aspect of the invention, a method for ungrouping sectors of a cell in a cellular communication system comprises the steps of: respectively generating pilot signals having distinct pseudo-random noise (PN) offsets for the sectors; respectively adding a common PN offset to the distinct PN offsets, the common PN offset being included in pilot signals for respectively transmitting to the sectors; respectively outputting to each sector one of the pilot signals having the distinct PN offsets and one of the pilot signals having the common PN offset; reporting signal strengths of the pilot signals having the distinct PN offsets by a mobile station to the base station, when the signal strengths increase above a predefined threshold; transmitting a traffic signal to the mobile station by the base station utilizing a respective channel that is transmitting to the respective sectors so that the base station may transmit and receive signals to a user through two paths; reducing the signal strengths of the pilot signals having the common PN offset transmitted to each of the plurality of sectors; respectively reporting the signal strengths of the pilot signals having the common PN offset by the mobile station to the base station, when the signal strengths are decreasing; transmitting the traffic signal to the mobile station through a new path by the base station, when the signal strengths of the pilot signals having the common PN offset decrease to below a predefined threshold; and discontinuing communication using the common PN offset by the mobile station so that the mobile station performs communication using only the distinct PN offsets.

These and other objects, features and advantages of the present invention will become apparent from the following detailed description of illustrative embodiments thereof, which is to be read in connection with the accompanying drawings, where the same reference numerals are used to represent the same functional elements.

DETAILED DESCRIPTION OF PREFERRED EMBODIMENTS

Figure 1:
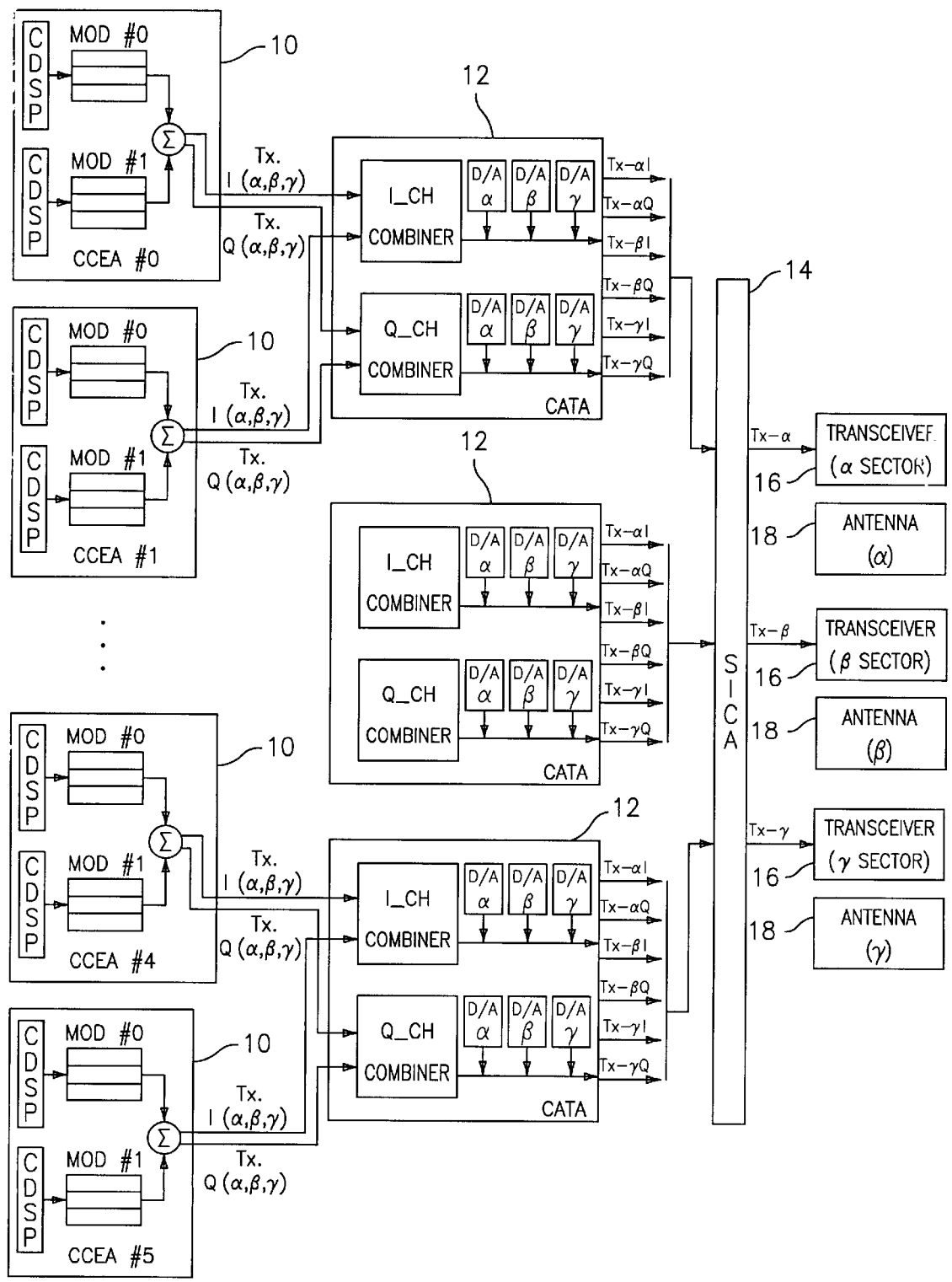
FIG. 1 is a schematic diagram of a base station according to the prior art.
Figure 2:
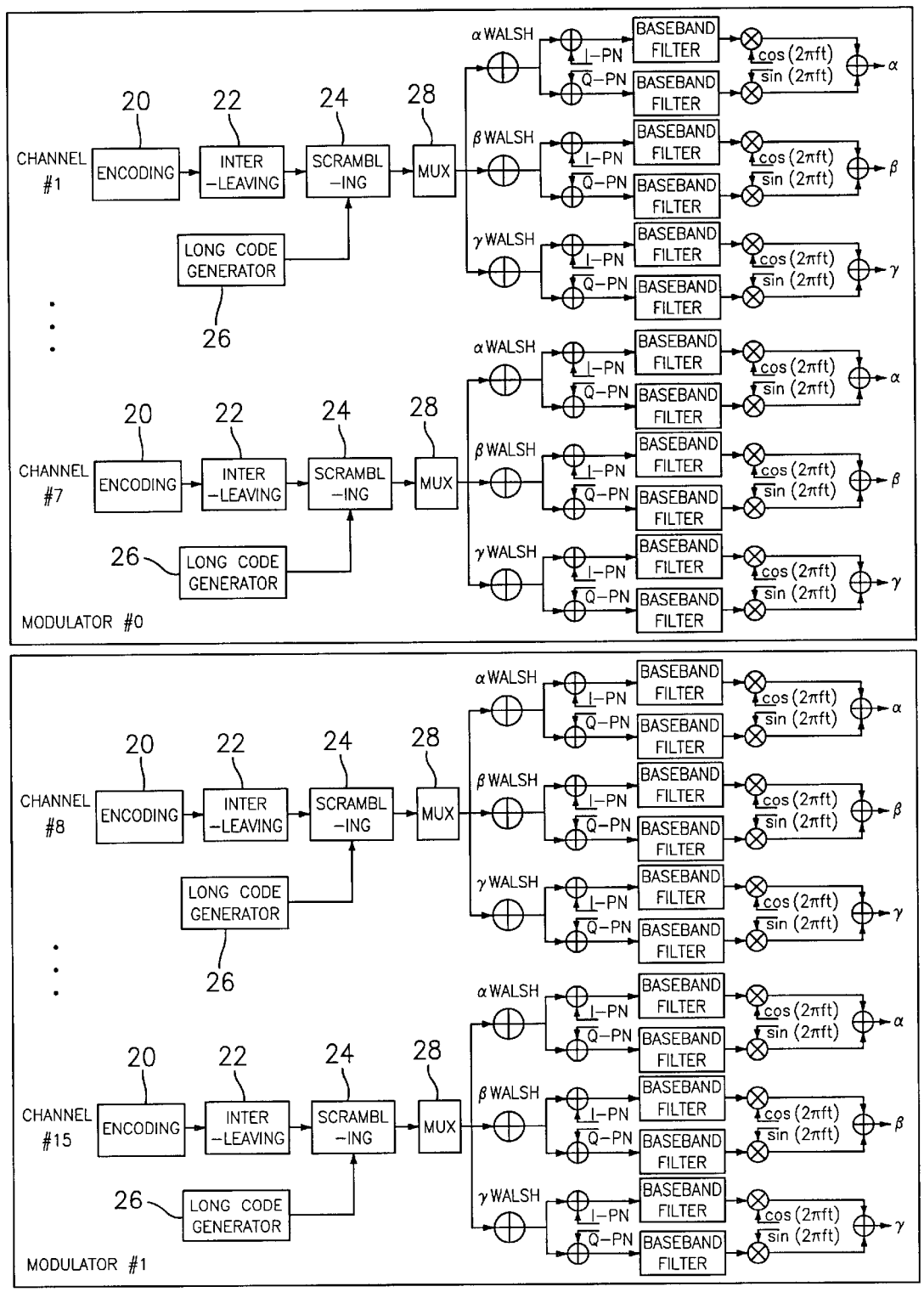
FIG. 2 is a schematic diagram of channel assignment paths in a channel card within the base station according to the prior art.
Figure 3:
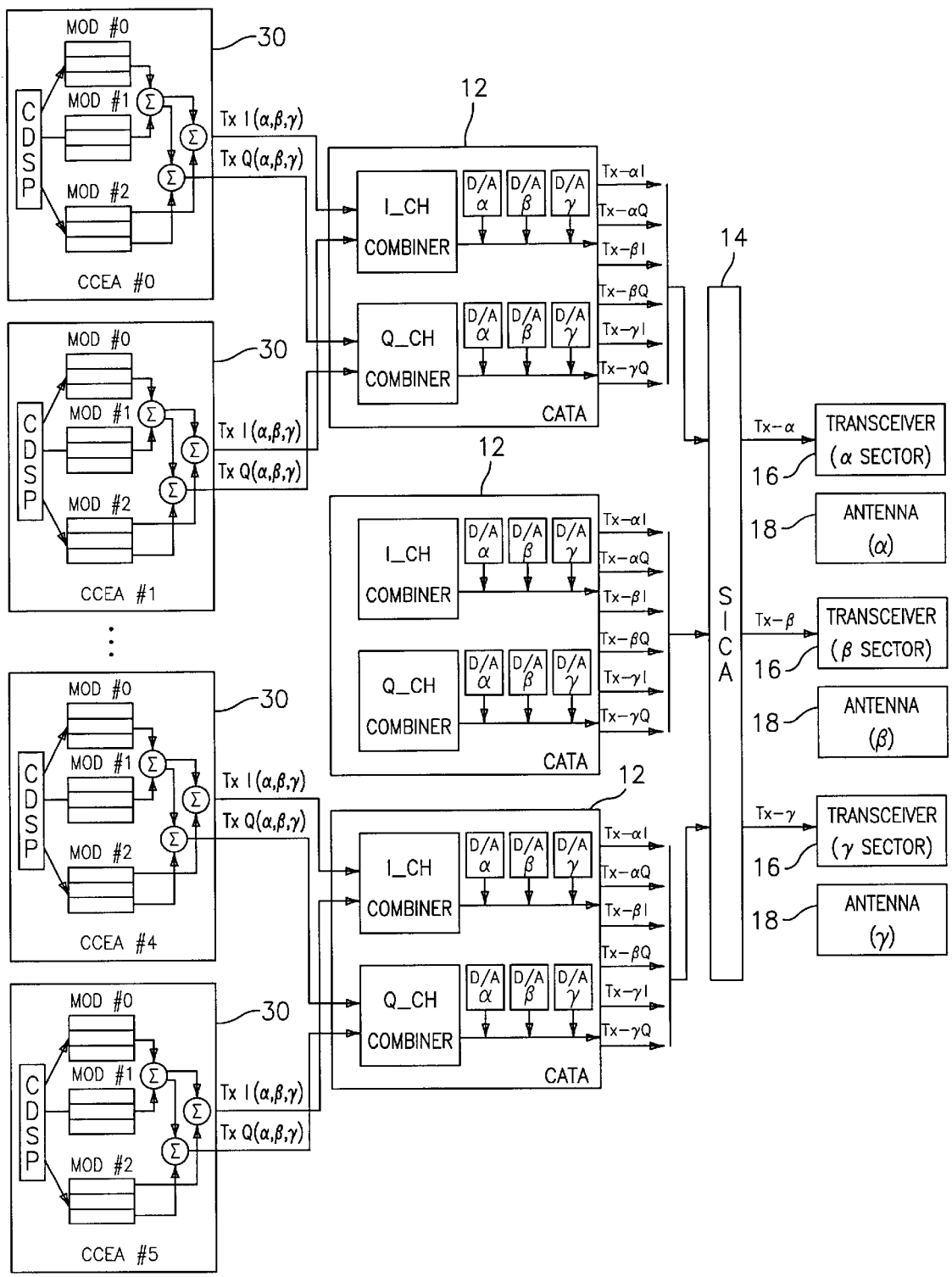
FIG. 3 is a schematic diagram of a base station according to an embodiment of the present invention.

The present invention is directed to methods for grouping and ungrouping sectors of a cell in a cellular communication system. Referring to FIG. 3, a schematic diagram is shown of a base station according to an embodiment of the present invention. In the base station, specifically in a CDMA Channel Element board Assembly (CCEA) 30 or channel card, a modulator chip #2 is added to existing modulator chips #0 and #1 in order to generate a PN offset which is grouped in a first path of modulator chip #2.

In accordance with a grouping method according to an embodiment of the present invention, three sectors, each having a distinct PN offset, are grouped together to form an omni-cell by designating a common PN offset for all three sectors. Accordingly, the distinct PN offset values used in communicating sectors are changed to the common PN offset value by transmitting the common PN offset to the communicating sectors.

The process of ungrouping sectors may be considered to be opposite to the process of grouping sectors. Accordingly, in the ungrouping process, the common PN offset values corresponding to a group of sectors are changed to the original distinct PN offset values. Therefore, the sectors are ungrouped in that they have different PN offset values.

As shown in FIG. 3, signals are modulated on a per sector basis in the CCEA, combined on a per channel basis in a Control And Transmit board Assembly (CATA) 30, and then provided (connected) to the transceivers 16 and antennas 18 managing each sector via a Sector Interface Card Assembly (SICA). The transceiver 16 for each sector transmits the received signals to the mobile stations through the antenna 18 which is under its control.

The modulator #2 can generate different PN offsets ($\delta$, $\pi$ and $\omega$) as compared to the PN offsets ($\alpha$, $\beta$ and $\gamma$) generated from modulators #0 and #1. Additionally, the modulator #2 may be used to generate the distinct PN offsets ($\alpha$, $\beta$ and $\gamma$) as well as the different PN offsets ($\delta$, $\pi$ and $\omega$) to be used as common PN offsets. The signals generated from modulator #2 are summed with the signals of the sectors generated from modulators #0 and #1 before transmission to the CATA.

Figure 4:
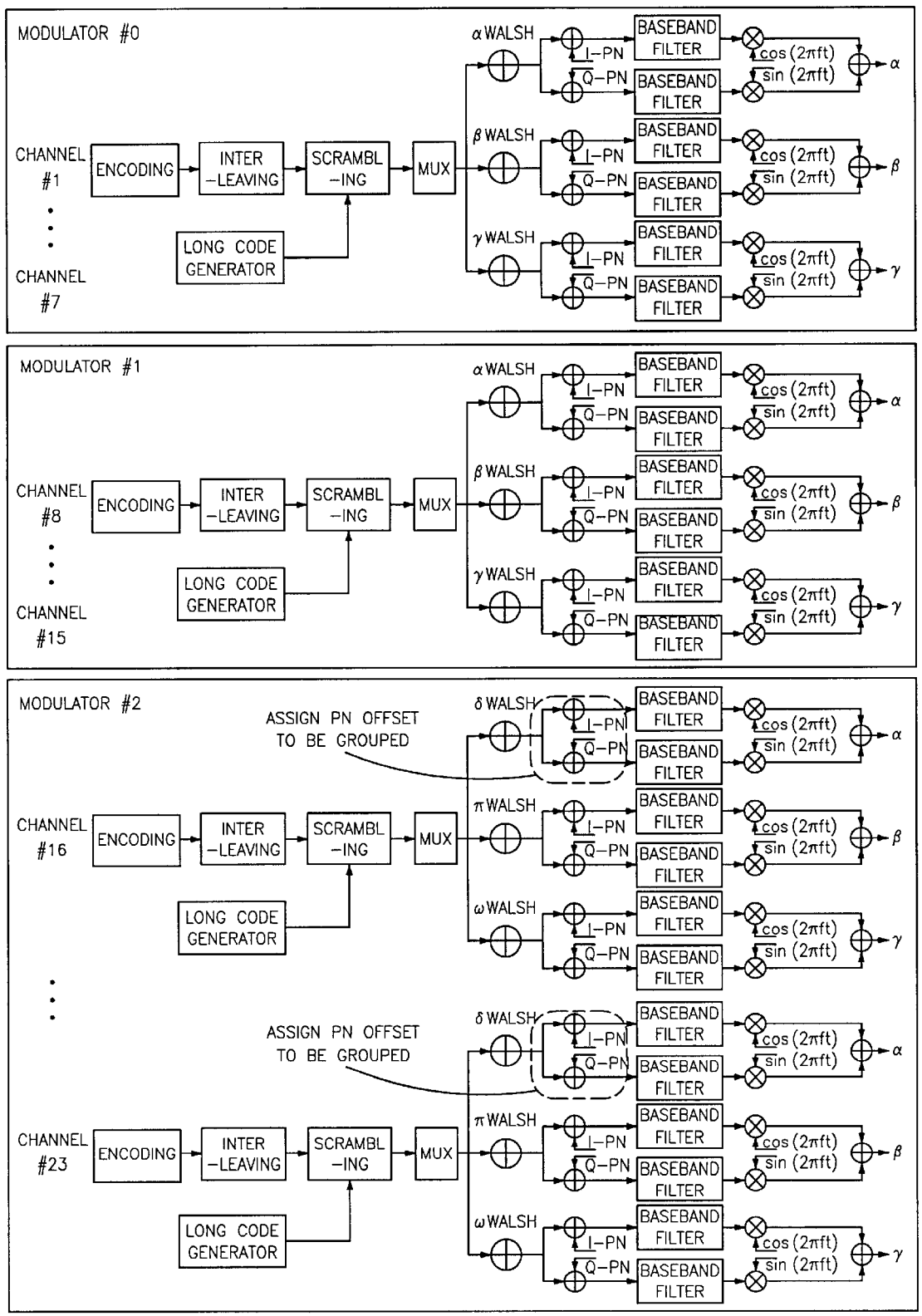
FIG. 4 is a schematic diagram of channel assignment paths in a channel card within the base station according to an embodiment of the present invention.

FIG. 4 is a schematic diagram illustrating channel assignment paths in a channel card within the base station according to an embodiment of the present invention. The channel card has three modulators, with each modulator having eight channels. The modulators #0 and #1 generate the existing distinct PN offsets, and modulator #2 generates the new common PN offset. Specifically, the first path $\delta$ of modulator #2 is utilized to generate the common PN offset.

Figure 5:
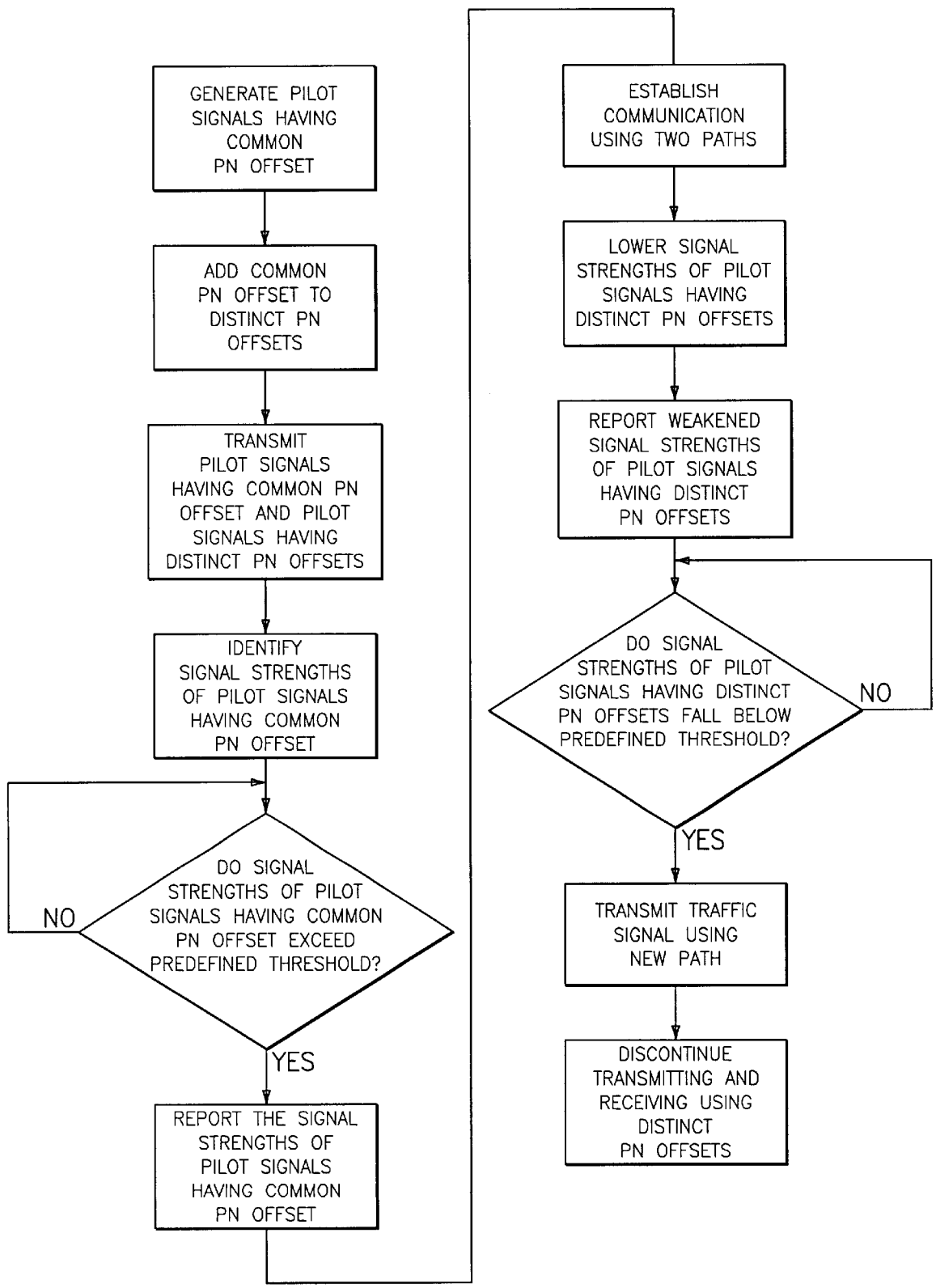
FIG. 5 is a flowchart of a method for grouping a plurality of sectors of a cell in a cellular communication system according to an embodiment of the present invention.

A method for grouping a plurality of sectors of a cell in a cellular communication system according to an embodiment of the present invention will now be discussed with reference to FIGS. 3 and 4 and the flow diagram of FIG. 5. A new pilot signal having the common PN offset ($\delta$) is generated through the first path of modulator #2 (step 502). This common PN offset ($\delta$) is different that the existing distinct PN offsets ($\alpha$, $\beta$ and $\gamma$) respectively used for each of the three sectors. The common PN offset ($\delta$) generated from modulator #2 is added to existing PN offsets $\alpha$, $\beta$ and $\gamma$ in the printed circuit board assembly (PBA) of the channel card (step 504). That is, the new common PN offset ($\delta$) is added to existing PN offset ($\alpha$) existing PN offset ($\beta$), and existing PN offset $\gamma$, respectively, so that the PN offsets may be transmitted to sectors $\alpha$, $\beta$ and $\gamma$ sectors, respectively.

The new pilot signal having the new common PN offset and the existing pilot signals having the existing distinct PN offsets are transmitted concurrently via antennas $\alpha$, $\beta$ and $\gamma$ (step 506). The signal strength of the new pilot signal is recognized by the mobile station (step 508). When the signal strength of the new pilot signal becomes more than a predefined threshold value, the mobile station reports the signal strength of the new pilot signal to the base station (step 510). Subsequently, the base station transmits a traffic signal to the mobile station utilizing a channel other than the pilot channel among the first paths in modulator #2, so as to transmit and receive signals to and from the user through the two paths (step 512).

While transmitting and receiving signals through the two paths, the base station gradually reduces the signal strength of the pilot signals previously used for the three sectors (i.e., the pilot signals having the distinct PN offsets) (step 514). Upon recognizing the weakening of the signal strength of the pilot signal, the mobile stations in the three sectors report the signal strength to the base station (step 516). When the signal strength of a pilot signal having the distinct PN offset decreases to below a predefined threshold value, the base station transmits a traffic signal to the mobile station through a new path, so that the user may communicate using only the new common PN offset (step 518). The mobile station discontinues transmitting and receiving the prior pilot signal having the distinct PN offset, and the three sectors transmit and receive signals using the new common PN offset (step 520). As a result of the above describing grouping method, since the three sectors have identical PN offsets, the three sectors are recognized as if they were one cell. Therefore, when the mobile station moves within the grouped sectors, a handoff is not required from one sector to another among the grouped sectors. While the method of FIG. 5 has been described with a plurality of pilot signals being generated which have the common PN offset, it is to be appreciated that, according to another embodiment of the present invention, only one pilot signal need be generated having the common PN offset. This single pilot signal having the common PN offset may then be transmitted to the plurality of sectors.

Figure 6:
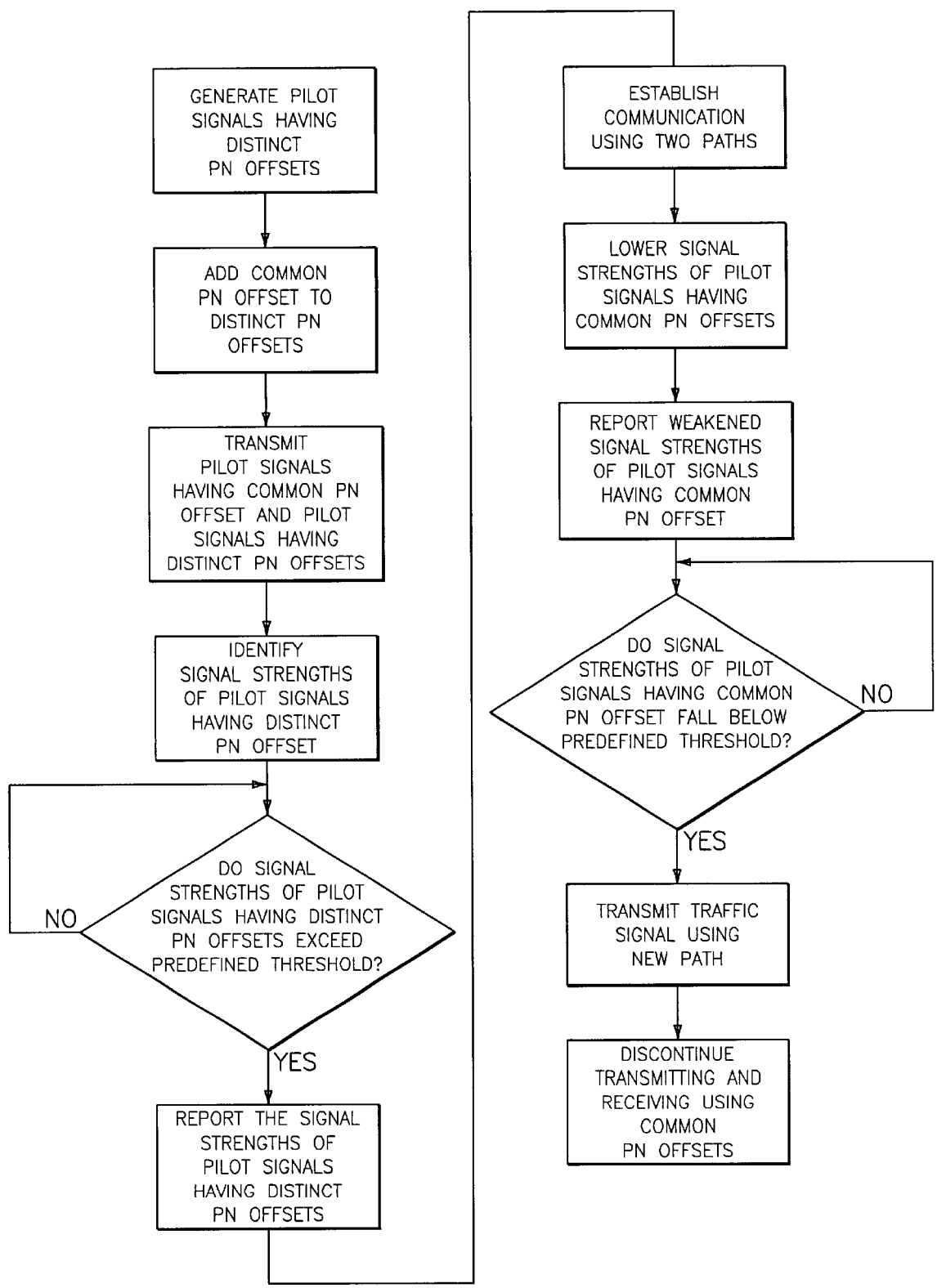
FIG. 6 is a flowchart of a method for ungrouping sectors of an omni-cell in a cellular communication system according to an embodiment of the present invention.

A method for ungrouping sectors of an omni-cell in a cellular communication system according to an embodiment of the present invention will now be discussed with reference to FIGS. 3 and 4 and the flow diagram of FIG. 6. The modulator chips employed for the existing three sectors (i.e., modulators #0 and #1) generate pilot signals having the prior PN offsets (i.e., the distinct PN offsets) for the respective sectors ($\alpha$, $\beta$ and $\gamma$) (step 602). The common PN offset $\delta$ generated from modulator #2 is added to PN offsets $\alpha$, $\beta$ and $\gamma$ generated from modulators #0 and #1 in the PBA of channel card 30 for subsequent transmission to sectors $\alpha$, $\beta$ and $\gamma$ via paths $\alpha$, $\beta$ and $\gamma$, respectively (step 604).

Pilot signals having the prior (distinct) PN offsets for each sector and the pilot signal having the common PN offset are transmitted through the same transceivers and antennas to the respective sectors (step 606). A mobile station recognizes the signal strength of the pilot signal having the distinct PN offset (step 608). When the signal strength of the pilot signal having the distinct PN offset becomes more than a predefined threshold value, the mobile station reports the signal strength of that pilot signal to the base station (step 610).

The base station transmit the traffic signal to the mobile station utilizing the channel which is currently transmitting to the sector so that the base station may transmit and receive the signal to the user (i.e., mobile station) via two paths (step 612). While transmitting and receiving the signal via two paths, the base station concurrently and gradually reduces the signal strength of the pilot signal having the common PN offset (step 614). Upon recognizing the weakening of the signal strength of the pilot signal having the common PN offset, the mobile station reports the signal strength of that pilot signal to the base station (step 616).

When the signal strength of the pilot signal having the common PN offset decreases below a predefined threshold value, the base station transmits a traffic signal to the mobile station through a path using the distinct PN offset so that the user communicates using only the distinct PN offset (step 618). The mobile station discontinues transmitting and receiving the pilot signal having the common PN offset, and the three sectors transmit and receive signals using the distinct PN offsets (step 620). Thus, following the above-described ungrouping method, the three sectors communicate using the distinct PN offsets. While the method of FIG. 6 has been described with a plurality of pilot signals being generated which have the common PN offset, it is to be appreciated that, according to another embodiment of the present invention, only one pilot signal need be generated having the common PN offset. This single pilot signal having the common PN offset may then be transmitted to the plurality of sectors.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for grouping a plurality of sectors of a cell in a cellular communication system, comprising the steps of:

generating pilot signals having a common pseudo-random noise (PN) offset, the common PN offset being different than each of a plurality of distinct PN offsets, each of the plurality of distinct PN offsets being included in one of a plurality of pilot signals and being associated with one of the plurality of sectors;

respectively adding the common PN offset to each of the plurality of distinct PN offsets;

outputting the pilot signals having the common PN offset and the plurality of pilot signals each having one of the plurality of distinct PN offsets;

respectively reporting signal strengths of the pilot signals having the common PN offset by mobile stations to the base station, when the signal strengths increase above a predefined threshold;

respectively transmitting a traffic signal to the mobile stations by the base station utilizing a channel other than a pilot channel;

respectively reducing the signal strengths of the plurality of pilot signals each having one of the plurality of distinct PN offsets and being transmitted to each of the plurality of sectors;

respectively transmitting the traffic signal to the mobile stations through a new path by the base station, when the signal strengths of the plurality of pilot signals decrease to below a predefined threshold; and discontinuing communication using the plurality of distinct PN offsets by the mobile stations so that the mobile stations perform communication using only the common PN offset.

2. The method of claim 1, wherein the common PN offset is generated through a first path of a third modulator of the base station.

3. The method of claim 1, wherein the plurality of distinct PN offsets are generated by a first and a second modulator of the base station.

4. A method for ungrouping sectors of an omni-cell in a cellular communication system, comprising the steps of:

respectively generating pilot signals having distinct pseudo-random noise (PN) offsets for the sectors;

respectively adding a common PN offset to the distinct PN offsets, the common PN offset being included in pilot signals for respectively transmitting to the sectors;

respectively outputting to each sector one of the pilot signals having the distinct PN offsets and one of the pilot signals having the common PN offset;

reporting signal strengths of the pilot signals having the distinct PN offsets by a mobile station to the base station, when the signal strengths increase above a predefined threshold;

transmitting a traffic signal to the mobile station by the base station utilizing a respective channel that is transmitting to the respective sectors so that the base station may transmit and receive signals to a user through two paths;

reducing the signal strengths of the pilot signals having the common PN offset transmitted to each of the plurality of sectors;

respectively reporting the signal strengths of the pilot signals having the common PN offset by the mobile station to the base station, when the signal strengths are decreasing;

transmitting the traffic signal to the mobile station through a new path by the base station, when the signal strengths of the pilot signals having the common PN offset decrease to below a predefined threshold; and discontinuing communication using the common PN offset by the mobile station so that the mobile station performs communication using only the distinct PN offsets.

5. A method for grouping three sectors α, β and γ of a cell in a cellular communication system, comprising the steps of:

generating pilot signals having a common pseudo-random noise (PN) offset δ through a first path δ of a third modulator of a base station, the common PN offset δ being different than each of a plurality of distinct PN offsets α, β and γ respectively associated with each of the sectors α, β and γ, each of the plurality of distinct PN offsets α, β and γ being included in a respective pilot signal, the plurality of distinct PN offsets α, β and γ being generated by a first and a second modulator of the base station;

respectively adding the common PN offset δ generated from the third modulator to each of the plurality of distinct PN offsets α, β and γ generated from the first and the second modulators;

respectively outputting to each of the plurality of sectors α, β and γ the pilot to signals having the common PN offset δ and the respective pilot signals having one of the plurality of distinct PN offsets α, β and γ through a same transducer and receiver;

reporting signal strengths of the pilot signals having the common PN offset δ by a mobile station to the base station, when the signal strengths increase above a predefined threshold;

transmitting a traffic signal to the mobile station by the base station utilizing a channel other than a pilot channel in the first path δ of the third modulator so that the base station may transmit and receive signals to a user through two paths;

reducing the signal strengths of the pilot signals respectively having one of the plurality of distinct PN offsets and being transmitted to each of the plurality of sectors;

transmitting the traffic signal to the mobile station through a new path by the base station, when the signal strengths of the pilot signals respectively having one of the plurality of distinct PN offsets decrease to below a predefined threshold; and discontinuing communication using the distinct PN offsets by the mobile station so that the mobile station performs communication using only the common PN offset.

6. The method of claim 5, wherein the third modulator generates the plurality of distinct PN offsets α, β and γ.

7. The method of claim 5, wherein the third modulator generates additional common PN offsets.

8. The method of claim 5, wherein said adding step is performed in a printed circuit board assembly of a channel card of the base station.

9. A method for ungrouping three sectors α, β and γ of an omni-cell in a cellular communication system, comprising the steps of.

respectively generating pilot signals having distinct pseudo-random noise (PN) offsets α, β and γ for sectors α, β and γ by a first and a second modulators;

respectively adding a common PN offset δ included in pilot signals for transmitting to the three sectors α, β and γ to the distinct PN offsets α, β and γ, the common PN offset δ being generated by a third modulator;

respectively outputting to each of the sectors α, β and γ the pilot signals having the common PN offset δ and the respective pilot signals having the distinct PN offsets α, β and γ through a same transducer and receiver;

reporting signal strengths of the pilot signals having the distinct PN offsets α, β and γ by a mobile station to the base station, when the signal strengths increase above a predefined threshold;

transmitting a traffic signal to the mobile station by the base station utilizing a respective channel that is transmitting to the respective three sectors α, β and γ so that the base station may transmit and receive signals to a user through two paths;

reducing the signal strength of the pilot signals having the common PN offsets transmitted to each of the sectors;

reporting the signal strength of the pilot signals having the common PN offsets δ by the mobile station to the base station, when the signal strength is decreasing;

transmitting the traffic signal to the mobile station through a new path by the base station, when the signal strengths of the pilot signals having the common PN offset decrease to below a predefined threshold; and discontinuing communication using the common PN offset by the mobile station so that the mobile station performs communication using only the distinct PN offsets.

10. The method of claim 9, wherein said reducing step concurrently and gradually reduces the signal strength of the pilot signals having the common PN offsets.

11. The method of claim 9, wherein said adding step is performed in a channel card of the base station.

12. The method of claim 9, wherein the common PN offset δ and the distinct PN offsets α, β and γ are respectively transmitted to the three sectors α, β and γ through a transceiver.

* * * * *